(12) United States Patent
Gurelli et al.

(10) Patent No.: US 7,263,385 B2
(45) Date of Patent: Aug. 28, 2007

(54) SYSTEM AND METHOD FOR BEAMFORMING WITH DATA RATE CONTROL FEEDBACK

(75) Inventors: Mehmet Izzet Gurelli, San Diego, CA (US); Raul Hernan Etkin, Albany, CA (US)

(73) Assignee: QUALCOMM Incorporated, San Diego, CA (US)

( * ) Notice: Subject to any disclaimer, the term of this patent is extended or adjusted under 35 U.S.C. 154(b) by 732 days.

(21) Appl. No.: 10/226,393

(22) Filed: Aug. 23, 2002

(65) Prior Publication Data
US 2004/0204106 A1    Oct. 14, 2004

(51) Int. Cl.
*H04M 1/00* (2006.01)
(52) U.S. Cl. .................. 455/562.1; 455/63.4
(58) Field of Classification Search ......... 455/67.11, 455/67.16, 69, 517, 522, 562.1; 375/225; 370/334
See application file for complete search history.

(56) References Cited

U.S. PATENT DOCUMENTS 6,330,460 B1 * 12/2001 Wong et al. ............. 455/562.1
6,430,399 B1 * 8/2002 Niemela ................... 455/67.16
6,731,947 B2 * 5/2004 Hoagland et al. ........... 455/517
2001/0021181 A1    9/2001 Choi
2003/0076797 A1 * 4/2003 Lozano ....................... 370/334
2004/0018818 A1 * 1/2004 Hottinen et al. ............. 455/78

FOREIGN PATENT DOCUMENTS

EP    1309102    5/2003
WO    9909677    2/1999

* cited by examiner

*Primary Examiner*—Lewis West
(74) *Attorney, Agent, or Firm*—Thomas R. Rouse; Thien T. Nguyen; Larry J. Moskowitz (57) ABSTRACT

Systems and methods for adaptively forming a transmission beam to optimize data transmissions to one or more receivers (mobile stations). In one embodiment, a method comprises varying a transmission beam pattern by controlling a parameter such as the phase shift between a primary transmission signal and a secondary transmission signal. As the beam pattern is varied, data is collected on the performance of communications using the beam. The data is then examined to identify values of the control parameter for which performance is maximized. The control parameter is then maintained at these values for longer periods of time than those values for which performance is lower. Data throughput can thereby be increased for situations in which there are relatively few mobile stations in the sector.

17 Claims, 8 Drawing Sheets

SYSTEM AND METHOD FOR BEAMFORMING WITH DATA RATE CONTROL FEEDBACK

FIELD OF THE INVENTION

The invention relates generally to wireless communication systems, and more particularly to systems and methods for adaptively forming a transmission beam to optimize data communications using the beam.

BACKGROUND

In a wireless voice/data communication system, a base station is associated with a sector. Mobile stations within the sector communicate with others, or with other networks via the base station. Typically, each mobile station only communicates with a single base station, so data will be freely transmitted from the mobile station to the base station. The base station, however, must be able to communicate with all of the mobile stations within its sector and must therefore be able to schedule transmissions to the various mobile stations.

One type of scheduler that may be used by the base station is referred to as a proportional fair scheduler. A proportional fair scheduler is designed to balance fairness of service among the mobile stations against the maximization of overall throughput of data by the base station. The scheduler compares the ratio of the requested data rate to the average throughput of the different mobile stations to take scheduling decisions.

The rate at which data can be transmitted to a given mobile station is determined by the signal-to-interference-and-noise ratio (SINR) at which the signal is received. With higher SINRs, data can be more reliably transmitted, so higher data rates are possible. With lower SINRs, transmissions are less reliable, so lower data rates are used. Since mobile stations' signal-to-interference-and-noise ratios generally fluctuate, the data rates also fluctuate.

The effect of using the proportional fair scheduler is to schedule users when their SINRs are large with respect to their average values, increasing the overall throughput of the base station while achieving fairness among users. As a result of the SINR fluctuations, the scheduler tends to distribute service among the mobile stations, each at its peak data rate.

By riding the peaks of the mobile stations, the scheduler achieves what is referred to as multi-user diversity gain. Multi-user diversity gains generally increases when the number of mobile stations in the sector increases, and when the dynamic range of fluctuation in the SINRs of the mobile stations increase (even when the average SINRs may remain the same).

While it may not be possible to increase the number of mobile stations in the sector, there are ways to increase the SINR fluctuations. One way to increase SINR fluctuations is to use a forward power control scheme that induces fluctuations. For example, in one such scheme, a beam which is formed by multiple, phase-shifted antennas is rotated to sweep through the sector. As the beam sweeps across a particular mobile station, the SINR for that mobile station peaks and then falls off.

This forward power control scheme works well if there are a relatively large number of mobile stations distributed throughout the sector, as one of them will usually be peaking at any given time and will therefore be selected by the scheduler. If, however, there are relatively few mobile stations in the sector, this scheme does not work as well. This is because there are periods when the beam is not directed to any of the mobile stations, so they all have relatively low SINRs and low data rates. Thus, when the sector has few active users the multi user diversity gain is low and the overall performance is degraded by the induced SINR fluctuations.

SUMMARY OF THE INVENTION

Broadly speaking, the invention comprises systems and methods for adaptively forming a transmission beam to optimize data transmissions to one or more receivers (mobile stations).

In one embodiment, a method comprises varying a transmission beam pattern by controlling a parameter such as the phase shift between a primary transmission signal and a secondary transmission signal. As the beam pattern is varied, data is collected on the performance of communications using the beam. The data is then examined to identify values of the control parameter for which performance is maximized. The control parameter is then maintained at these values for longer periods of time than those values for which performance is lower. Data throughput can thereby be increased for situations in which there are relatively few mobile stations in the sector.

In one embodiment, a base station employs a pair of antennas to beamform the transmitted signal. The resulting transmission beam is effectively rotated to sweep through the corresponding sector. As the beam is rotated, the base station receives data rate requests from the mobile stations indicating the strength of the transmitted signal. The base station tracks this information to identify the beam positions that result in the highest data rate requests (hence can support the highest data throughput). The base station can then increase the amount of time during which these beam positions are used, thereby increasing the amount of time for which a higher data rate can be used to communicate with the mobile stations.

Another embodiment of the invention comprises a software application. The software application is embodied in a computer-readable medium such as a floppy disk, magnetic tape, CD-ROM, DVD-ROM, RAM, ROM, or the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

Broadly speaking, the invention comprises systems and methods for adaptively forming a transmission beam to optimize data transmissions to one or more receivers (mobile stations). In one embodiment, a base station employs a pair of antennas to beamform the transmitted signal. The resulting transmission beam is effectively rotated to sweep through the corresponding sector. As the beam is rotated, the base station receives data rate requests from the mobile stations indicating the strength of the transmitted signal. The base station tracks this information to identify the beam positions that result in the highest data rate requests (hence can support the highest data throughput). The base station can then increase the amount of time during which these beam positions are used, thereby increasing the amount of time for which a higher data rate can be used to communicate with the mobile stations.

Figure 1:
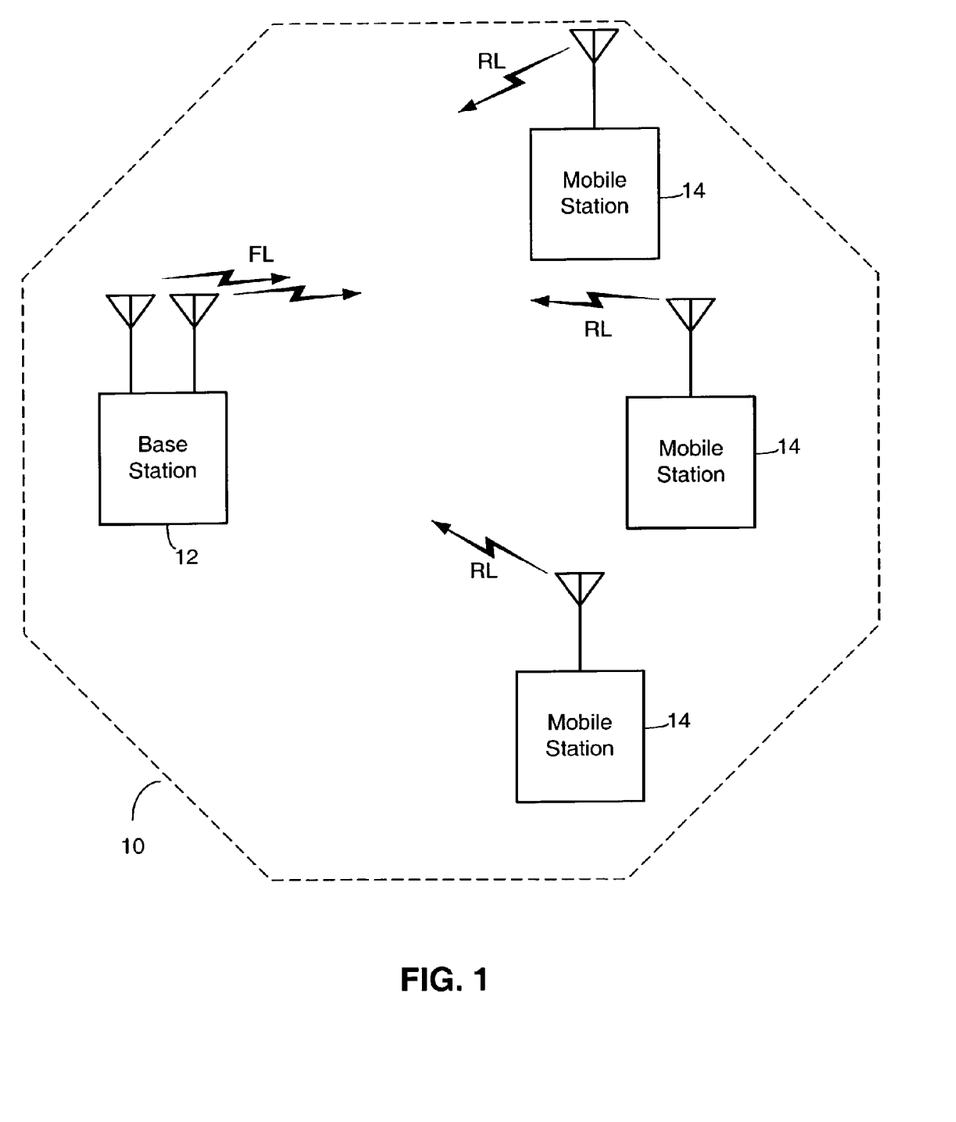
FIG. 1 is a diagram illustrating a wireless communication system capable of operation in accordance with one embodiment.

Referring to FIG. 1, a diagram illustrating a wireless communication system in one embodiment is shown. In this system, a sector 10 includes at least one base station 12 and several mobile stations 14. Base station 12 transmits data to the mobile stations 14 via what is referred to herein as the forward link (FL). Mobile stations 14 transmit data back to base station 12 via what is referred to herein as the reverse link (RL). Mobile stations may move within the sector, or they may move out of the sector associated with base station 12 and into a sector associated with another base station.

Base station 14 is configured to perform beamforming operations through the use of an antenna array. ("Beamforming" is used herein to refer to the forming of a directional transmission pattern for the forward link of a base station.) In a two antenna implementation, the first of the antennas transmits a data signal with a constant amplitude and phase, while the other of the antennas transmits the same data signal, but at a possibly lower amplitude and with a phase shift. The two signals interfere with each other, constructively in some regions and destructively in others, resulting in a modified transmission pattern.

Figure 2:
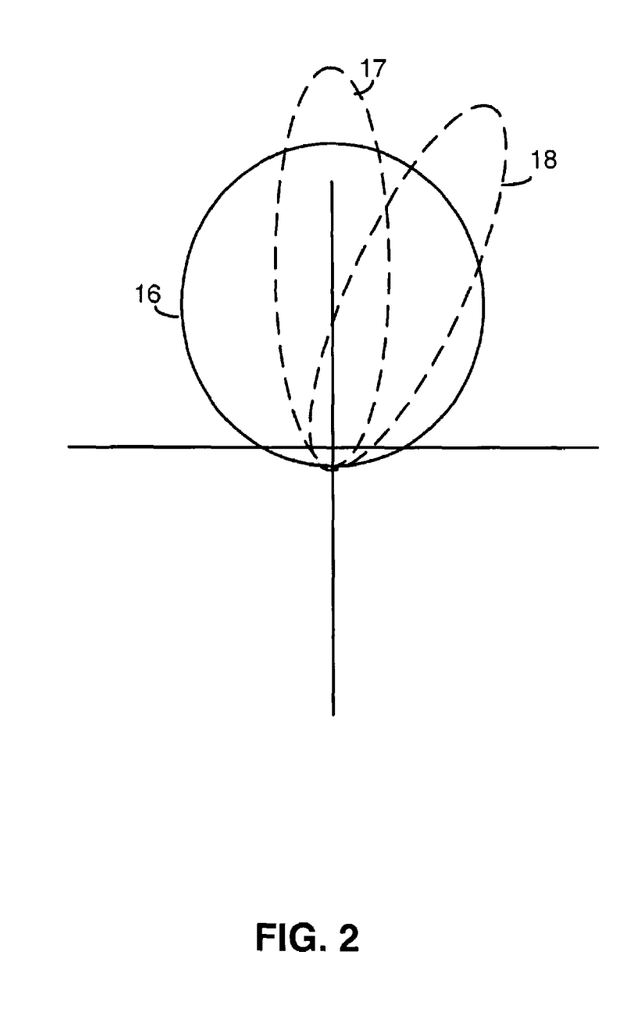
FIG. 2 is a diagram illustrating different transmission patterns of a beam transmitted from a base station in accordance with an embodiment.

Referring to FIG. 2, a diagram illustrating different transmission patterns of the base station's 12 forward link is shown. In the absence of the phase-shifted second signal from the secondary antenna, the transmission pattern of the forward link is constant, with a given beam width 16. The inclusion of a second antenna with a phase shift causes the radiation pattern of the transmitted beam to be shifted from the original pattern 16 to more of a directional beam 17. The phase shift of the second signal can be varied with time—as the phase shift increases, the beam rotates, effectively scanning around the sector 10 (see beam 18). Other antenna structures, and other parameters rather than phase can be used to control the radiation patterns and to vary them in time.

As the base station 12 transmits signals (beamformed or otherwise), each of the mobile stations 14 within the sector 10 receives the signal, computes a SINR (signal-to-interference-and-noise ratio), selects a corresponding data rate that can be supported and transmits a DRC (data rate request) to the base station 12 indicating the supportable data rate. The strength of the signal received by each of the mobile stations 14 varies as the beam transmitted by the base station 12 sweeps through the sector 10. Each mobile station 14 continues to compute SINRs and transmit corresponding DRCs to the base station 12 as the beam sweeps through the sector 10. The SINRs and DRCs for a given mobile station 14 are normally higher when the beam is directed toward the mobile station 14, and lower when the beam is directed away from the mobile station 14. Also, SINR fluctuations are influenced by the interference received from other sectors, which also varies in time as the corresponding beams are varied. Finally, the base station 12 can receive feedback of the mobile stations' 14 channel states by other means instead of DRCs, such as measured SINR values.

The base station 12 is configured to track the DRCs received from each of the mobile stations 14 and to identify the phase shifts at which the DRCs are maximized for the respective mobile stations 14 ("optimal phase shifts"). Because the highest data rates can be achieved at the optimal phase shifts, the base station 12 is configured to dwell on the optimal phase shifts and to scan more quickly across phase shifts at which none of the mobile stations 14 is optimized. As the number of mobile stations 14 in the sector 10 increases, assuming they are distributed throughout the sector 10, this solution converges to the solution of simply rotating the beam and sweeping the entire sector 10 at a constant angular speed.

1xEV is a data communication standard that is part of the CDMA2000 family of standards (IS-856). The name "1xEV" refers to the relation to the CDMA2000 family ("1x") and the evolution of the standard ("EV"). 1xEV provides a 1.25 MHz channel, and utilizes the same RF components as used in existing networks and devices. 1xEV has the same coverage as cdmaOne and CDMA2000 networks.

A 1xEV system allows communication at 12 different data rates ranging from 38.4 kbps to 2.4 Mbps. A data packet transmitted at 38.4 kbps requires 16 slots to be transmitted, while a packet transmitted at 2.4 Mbps requires a single slot. (A "slot" in this system is a 1.66 millisecond period in which 2048 CDMA chips can be transmitted.) Typically, the performance of data transfers at a particular data rate (in terms of a bit error rate) drops off fairly sharply. At a SINR above the threshold at which performance drops off, the performance of data transfers is expected to be above a minimum level. If the SINR is below the threshold, the performance of data transfers is expected to be below the minimum level.

Thus, if the SINR of a signal received from a base station is at a certain level, a maximum data rate that can be supported (e.g. one at which the error rate is less than or equal to an acceptable level) can be identified.

From the perspective of a mobile station, the SINR varies as a function of time. The SINR may vary as a result of movement of the mobile station, movement of the surrounding objects, changes in atmospheric conditions, and various other factors. Because the SINR is variable, the mobile station is configured to dynamically select a data rate which is appropriate for the currently measured SINR. For example, if the SINR is very low, the mobile station may select a data rate of 38.4 kbps. If, on the other hand, the SINR is very high, a higher data rate can be supported, and the mobile station may select a data rate of 2.4 Mbps. The mobile station then transmits a DRC to the base station requesting that data be transmitted to the mobile station at the selected data rate.

It should be noted that, typically, the mobile station does not select the DRC based upon computation of an instantaneous SINR, but instead uses a prediction and rate control algorithm. The purpose of the algorithm is to forecast the future SINR condition and accordingly request a data rate for the next packet (through the reverse link DRC channel) that can be decoded with a low probability of error.

The mobile station measures the SINR based upon the pilot burst which is transmitted twice in every slot. The pilot burst consists of a 96-chip signal in the middle of each half-slot. The pilot burst signal is transmitted to all of the mobile stations within a base station's sector. Each mobile station computes its own SINR based upon the pilot burst signal as received by that mobile station.

After the mobile station has calculated the SINR of the pilot burst signal, the measurement is fed to a predictor and rate control system. The predictor generates a set of SINR estimates for the different packet lengths which are fed to a rate selection algorithm to generate a DRC. The DRC indicating the selected data rate is then transmitted back to the base station to request that data be transmitted to the mobile station at the selected rate. The SINR can be re-calculated (and a corresponding data rate selected, and a DRC transmitted to the base station) every slot, or up to 600 times per second. The requested data rate is then maintained by the base station for that mobile station for a predetermined number of slots. Typically, the number is two slots for a mobile station which is active in a single sector, or four slots for a mobile station which is active in two sectors (in handoff between sectors).

It should be noted that the computation of a local SINR is carried out concurrently by each of the mobile stations 14 within a sector 10. Each mobile station 14 selects a data rate that can be supported by the locally computed SINR and transmits its own DRC to the base station 12. The base station 12 separately maintains the DRC's for the individual mobile stations 14 and transmits data to the various mobile stations 14 at the data rates requested by the respective mobile stations 14.

Figure 3:
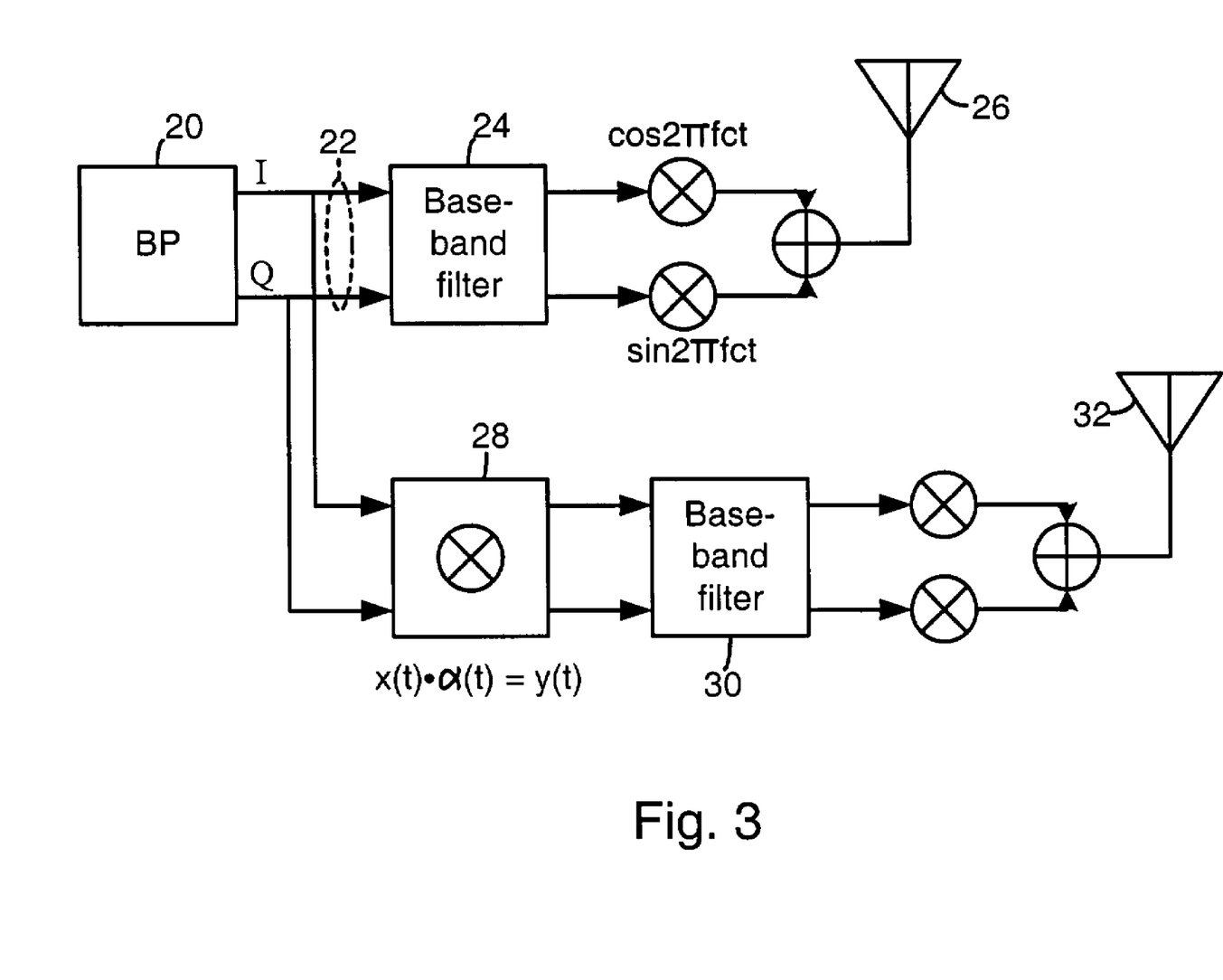
FIG. 3 is a functional diagram illustrating the structure of the signal transmission system of a base station in one embodiment.

As indicated above, the base station 12 utilizes two antennas to transmit data to the mobile stations 14 in the sector 10. Referring to FIG. 3, a functional diagram illustrating the structure of the signal transmission system of a base station 12 in one embodiment is shown. In this figure, baseband processor 20 generates a signal to be transmitted. The signal is transmitted via interconnects 22 to a baseband filter 24 for processing. (The complex signal comprises an in-phase component I and a quadrature component Q.) The complex signal is then modulated and summed before being transmitted by primary antenna 26.

The complex signal generated by baseband processor 20 is also provided to a complex multiplier 28. Complex multiplier 28 modifies the amplitude and phase of the complex signal before the signal is processed by baseband filter 30, modulated, summed and transmitted by antenna 32. Antenna 32 is located close to antenna 26 (e.g., within several meters). In one embodiment, complex multiplier 28 reduces the amplitude of the signal and introduces a phase shift so that the resulting signal interferes with the signal from antenna 26 (constructively in some regions and destructively in others) to form a shaped transmission pattern. The transmission pattern is shifted from the original pattern 16 to a more elongated pattern 17 that is referred to herein as a "beam". The function of the complex multiplier 28 can be accomplished somewhere else in the system. For example, a phase and amplitude shifter may follow the summation block preceding antenna 32.

In this embodiment, the beam is rotated around the antennas 26 and 32 so that the beam sweeps through the sector 10 of the base station 12. This is accomplished by varying the phase shift introduced into the signal transmitted by antenna 32. A linearly increasing (or decreasing) phase shift causes the beam to sweep through the sector 10 periodically.

It should be noted that, the particular components employed by the base station 12 described above to process the signal for transmission may not be necessary for every possible embodiment. Other embodiments may perform entirely different processing. In fact, it is not even necessary that the beam be shaped by the phase-shifting means described above, as long as the beam can be shaped in some controlled manner. The point of the illustrated embodiment is to show that a beam is formed and can be manipulated as a function of some control parameter (e.g., phase shift).

Because the mobile stations 14 calculate SINRs and transmit appropriate DRCs back to the base station 12 many times per second, the DRCs can be viewed as a function of time. More importantly, they can be viewed as a function of the form of the beam pattern of the forward link. In the embodiment described above, in which the beam pattern varies as a function of phase shift, the DRCs of the mobile stations 14 can be correlated to the phase shift.

Figure 4:
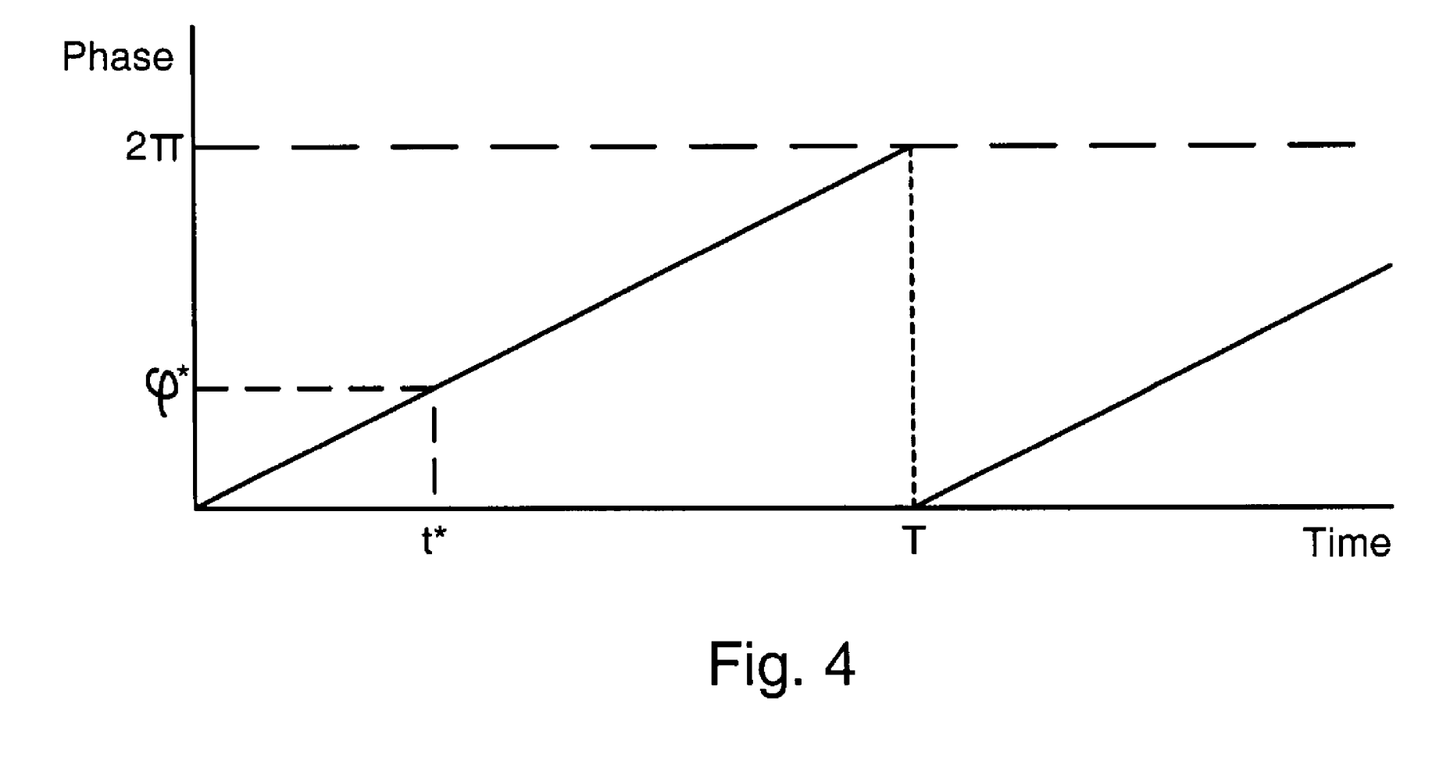
FIG. 4 is a diagram illustrating the phase shift of a secondary transmission signal with respect to a primary transmission signal in a dual-antenna base station in accordance with one embodiment.

Referring to FIG. 4, a diagram illustrating the phase shift of the secondary signal with respect to primary signal is shown for a beam that is rotating with a frequency of 1/T cycles per second. The phase shift increases linearly from 0 to $2\pi$ radians over a period of time T seconds, and then repeats. It should be noted that the phase shift of the secondary signal may actually increase in steps, but is depicted as continuously increasing for the sake of simplicity. The effect of the phase shift is to cause the beam pattern formed by the base station to rotate with a period of T (hence a frequency of $f_{FPC}=1/T$.)

As the beam pattern sweeps through the sector 10, each mobile station 14 in the sector 10 measures the SINR of the received signal and transmits appropriate DRCs back to the base station 12. The measured SINR varies essentially periodically with the phase of the transmitted beam, although there may be variations resulting from movement of the mobile station 14 and changes in the conditions for transmission of the beam.

Figure 5:
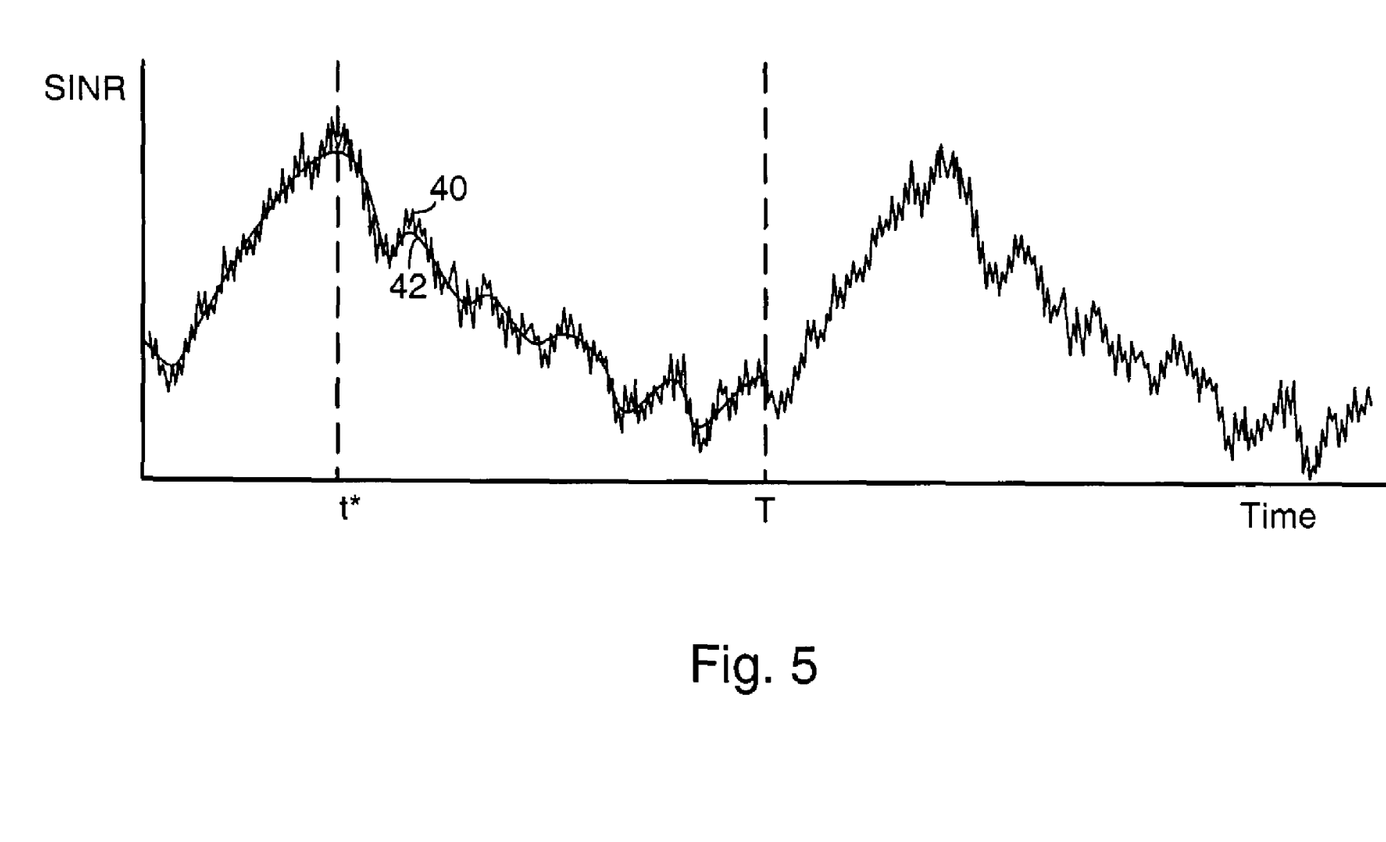
FIG. 5 is a diagram illustrating the signal-to-interference-and-noise ratio measured by a mobile station in one embodiment as a function of time.

Referring to FIG. 5, a diagram illustrating the SINR 40 measured by one mobile station 14 is shown as a function of time. The SINR has a periodic component with the same frequency as the rotation of the beam. The SINR measured by the mobile station 14 may be noisy. Therefore, in one embodiment, the mobile station 14 filters the measured SINR to obtain a smoother curve 42 for the SINR. The mobile station 14 also employs a rate prediction algorithm to select the appropriate data rate for the current SINR. This data rate is communicated to the base station 12 via the DRCs.

Figure 6:
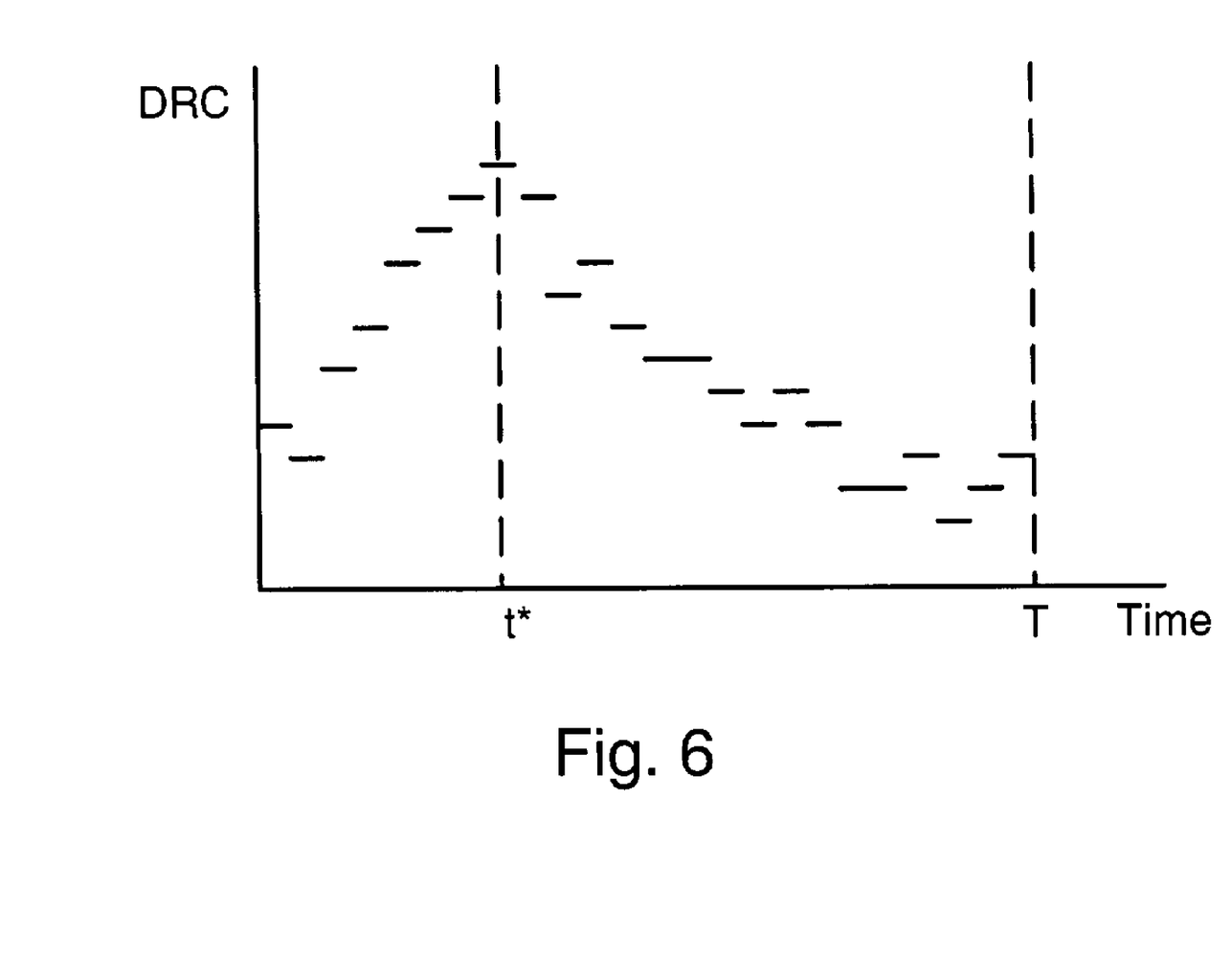
FIG. 6 is a diagram illustrating the data rate requests received from a mobile station in one embodiment as a function of time.

As the DRCs are received by the base station 12, the information is stored. The base station 12 therefore has data indicating the data capacity of the forward link to the mobile station 14 as a function of time. Referring to FIG. 6, a diagram illustrating the DRCs received from the mobile station 14 as a function of time is shown. The DRC curve is discontinuous since the DRCs indicate one of 12 discrete data rates that can be selected by the mobile station 14. (The time granularity of the curve in the figure is exaggerated and, as indicated above, the mobile station 14 may recalculate and transmit a new DRC up to 600 times per second.)

From the curve of FIG. 6, the peak data rate and the corresponding time can be identified. The time at which the peak occurs is marked as t*. Referring again to the phase-shift versus time diagram of FIG. 4, time t* can be correlated to a phase shift $\phi$*. (In fact, the DRC or data rate can be maintained as a function of the phase shift instead of time.) Thus, when the secondary signal transmitted by the base station 12 is shifted by an angle $\phi$*, the resulting transmission beam pattern supports the maximum data rate requested by the mobile station 14.

The DRCs are tracked in this manner for each of the mobile stations 14 within the base station's 12 sector 10. For each of the mobile stations 14, the corresponding data is used to identify a phase shift at which the mobile station 14 receives data with the highest SINR and can receive data at the greatest rate. Because the DRC information received from the mobile stations 14 is based on the SINRs measured by the mobile stations 14, this information typically includes some noise. The base station 12 may therefore be configured to filter the DRC information to smooth the DRC curves and facilitate selection of optimal phase shifts for the various mobile stations 14.

In one embodiment, the base station 12 maintains a running average, as a function of phase shift, of the DRCs received from each mobile station 14. The average may, for example, be based on an IIR filter. The time constant of the filter should be selected so that that the curve for the average DRC as a function of phase shift actually indicates the correlation between the phase shift and the channel conditions for the mobile station 14. In other words, the time constant should be large enough that it reduces the noise from transient channel fluctuations, but small enough that the mobility of the mobile station 14 can be tracked. Since the DRCs versus phase shift are tracked for each mobile station 14, a separate filter time constant can be selected for each mobile station 14. The performance of the filter can therefore be optimized for each mobile station 14 based on the fading characteristics of the mobile station 14.

The tracking and filtering of the DRC information can be performed as follows. First, the interval from 0 to $2\pi$ is discretized into N sub-intervals. The phase shift $\phi$ for an interval i is thus $$\phi_i = i * \Delta\phi,$$

where i=0, 1, . . . N and $\Delta\phi = 2\pi/N$. At each phase $\phi i$, the DRC for each mobile station k is updated. The filtered DRC corresponding to phase $\phi_i$ of user k can be calculated as $$f_{i,k}[n+1] = \alpha_k f_{i,k}[n] + (1-\alpha_k) DRC_k[n].$$

As noted above, $\alpha_k$ can be selected for each mobile station to optimize the filter for that mobile station's fading characteristics. Also $\alpha_k$ can be kept constant for all mobile stations.

The estimated DRC can also be filtered on the basis of the correlation between the different phase shift values. The filtering of the DRCs across phase shift values is done by convolving the DRC function $f_{i,k}$ with an impulse function $h_k[i]$:

$$g_{i,k} = (f_{i,k} \otimes h_k[\cdot])[i],$$

where $\otimes$ indicates periodic convolution (with period N), and where the impulse response of the filter $h_k[i]$ is selected according to the correlation of the mean DRC value and the phase shift $\phi$.

Then, the filtered DRC function $g_{i,k}[n]$ can be used to identify the phase shift at which the DRC is highest. This can be stated as $$\hat{\phi}_k[n] = \arg\max_i g_{i,k}[n],$$

where $\hat{\phi}_k[n]$ is the optimal phase shift for mobile station k. The correlation between the mean DRCs and phase shift can also be calculated as the ratio:

$$\rho_k[n] = \hat{\phi}_k[n] / \overline{\phi}_k[n],$$

where $\overline{\phi}_k[n] = \Sigma_{i=0}^{N-1} g_{i,k}[n]/N$.

After the base station 12 has filtered the DRC information and identified the optimal phase shifts, $\hat{\phi}_k$, the beamforming process can be adapted to take these optimal phase shifts into account to increase the amount of time that the forward link can support higher data rates to the mobile stations 14. The ratios $\rho_k$ can be used to dynamically vary the impulse response, $h_k[i]$, of the filter used to generate $g_{i,k}$.

It should be noted that, because the base station 12 may have no data to transmit to some of the mobile stations 14, the data for those mobile stations 14 may be minimized or disregarded. The optimal phase shifts for these mobile stations 14 should nevertheless be determined so that the information is available if the base station 12 receives data to be transmitted to the mobile stations 14. After the optimal phase shifts of the mobile stations 14 are determined, however, there is no need to maintain these phase shifts if there is no data to be transmitted to these mobile stations.

One of the simplest ways to adapt the formation of the forward link beam would be to simply alternate between the optimal phase shifts for the mobile stations 14 in the sector 10. In other words, rather than stepping uniformly through the 0-$2\pi$ range, the phase shift could be maintained at $\phi_1$* for a certain amount of time, then $\phi_2$*, and so on (where $\phi_n$* is the optimal phase shift for the nth mobile station 14 in the sector 10).

Figure 7:
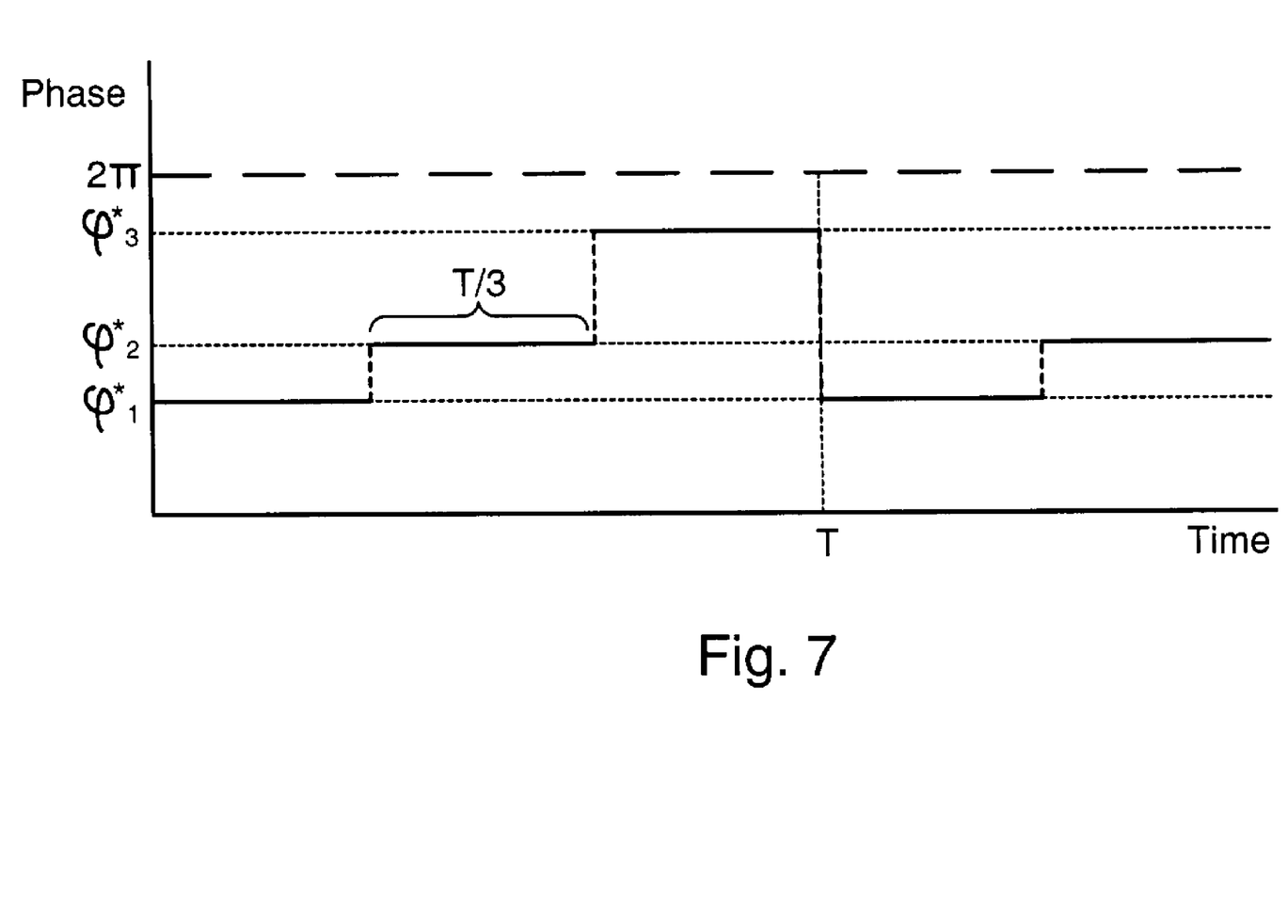
FIG. 7 is graph of phase shift versus time in one implementation of a base station employing dual antennas to transmit phase-shifted signals.

Referring to FIG. 7, a graph of phase shift versus time illustrating the implementation of this type of optimization is shown. In this example, there are three mobile stations 14 in the sector. Thus, there are three optimal phase shifts that are assumed to have been identified to correspond to the mobile stations 14. The optimal phase shifts are $\phi_1$*, $\phi_2$* and $\phi_3$*. During the period T, the beam is transmitted for T/3 at each phase shift. The phase shift starts at $\phi_1$*, then increases to $\phi_2$* and then increases to $\phi_3$*, then repeats.

Figure 8:
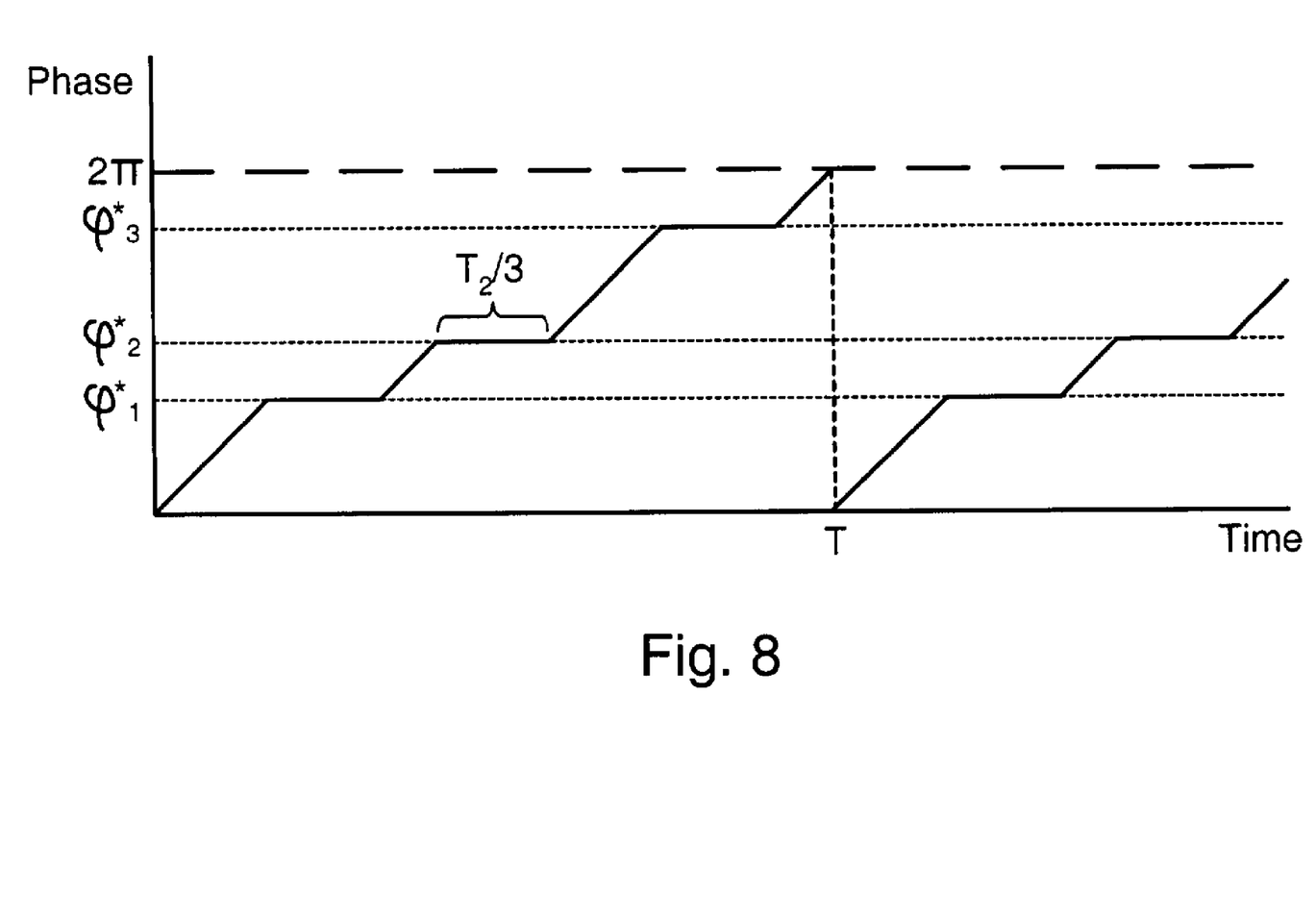
FIG. 8 is graph of phase shift versus time in an alternative implementation of a base station employing dual antennas to transmit phase-shifted signals.

The simple switching back and forth between optimal phase shifts, however, is not an ideal solution for several reasons. One reason is that if the beam is not rotated, the base station 12 cannot obtain data as a function of phase shift for mobile stations 14 that later enter the sector 10. Rapidly switching from one phase to another may also increase the difficulty of tracking pilot bursts, and other control information. It is therefore considered a better solution to dwell on one of the optimal phase shifts, then sweep through the intermediate phase shifts to the next optimal phase shift, and so on. The resulting phase as a function of time is illustrated in FIG. 8 for the situation in which there are three mobile stations 14 in the sector 10.

In one embodiment, the base station 12 is configured to spend an amount of time $T_1$ sweeping through the 0-2π range of phase shifts at a constant rate (i.e., $2\pi/T_1$ rad/sec). The remainder of the period T (i.e., $T_2=T-T_1$) is spent at the previously identified optimal phase shifts ($\phi_n^*$). In this embodiment, an amount of time $T_2/K$ is spent at each of the identified optimal phase shifts, where K is the number of mobile stations 14 in the sector 10 In the situation depicted in FIG. 8

The phase shift in this embodiment can be defined as follows. At initialization, $\phi=0$.

The phase shift is then incremented to sweep the beam through the sector 10:

$\Phi[n+1]=(\phi[n]+\Delta\phi) \bmod (2\pi)$ if $\phi[n] \neq \hat{\phi}_k$ ∀k or n is the last slot of a beamforming configuration. When the phase shift reaches a value that is optimal for one of the mobile stations 14, the phase shift remains at the optimal value for a time $T_2/K$:

$\phi[m]=\phi[n]$ for $n \leq m < n+T2/K$, if $\phi[n]=\hat{\phi}_k$ for some k.

Sweeping the beam through the sector 10 in this manner may meet a number of goals. For example, the phase shift is driven to some optimal phase shift for serving a particular mobile station 14. Put another way, the phase shift dwells at the optimal values identified for the mobile stations 14 in the sector 10. It should be noted that the scheduler may or may not be biased to serve the particular mobile station 14 for which the phase shift is optimal at a given time.

Another of the goals is that the time spent at the optimal phase shifts for the different mobile stations 14 is equal. The phase shift is maintained at each optimal value for $T_2/K$. With equal time spent at each of the optimal phase shifts, a scheduler running independently of the beamforming system should tend toward equal time scheduling for the different mobile stations 14. In some embodiments, the amount of time spent at each optimal phase shift could be based on the peak-to-average ratio, $\rho_k$. If $\rho_k \approx 1$, then there is no advantage to having the beam formed with that phase shift, so the system might spend no extra time at that phase shift. Similarly, if there is no data in queue for a particular mobile station 14, there is no need to optimize the forward link for that mobile station 14. In another embodiment, the allocated time at each optimal phase shift could alternatively be a function of quality of service requirements for each mobile station 14. Another goal is that the beam regularly sweeps through the entire sector (i.e., the phase goes from 0 to 2π). The system is therefore able to continually update the DRC and optimal phase shift information, including identifying new mobile stations 14 in the sector 10 and handing off mobile stations 14 to other sectors. Another goal is that the system enables the beamforming to be temporarily disabled. Control channels can therefore be transmitted using an antenna with a broad radiation pattern to allow the reception of the control channel by all mobile stations in the sector.

Yet another goal is that the system operates in a periodic manner, where the period is not so small that the induced channel fluctuations degrade the predictability of the channel by the mobile station, yet not so large that delay variations between packets are worsened.

It should be noted that the method described above may not be able to track the channel conditions for a mobile station 14 if the channel conditions change more rapidly than the time constant for the updating of the tracked information (DRCs versus phase shift). In this situation, the method may need to be modified.

In this embodiment, DRC data is still tracked and a running average of the DRCs is maintained. When the phase shift is incremented (by $\Delta\phi$), the ratio of the current DRC to the average DRC for a mobile station k ($DRC_k/AVG\_DRC_k$) is determined. If this ratio is greater than a predetermined threshold value for mobile station k, then the phase shift is treated as optimal and is kept constant for a period of time (e.g., $T_2/K$) rather than continuing to increment $\phi$. Rapidly changing conditions may therefore be more closely tracked.

While the foregoing description is directed particularly to embodiments of the invention that comprise methods, it should be noted that other embodiments are possible. For example, one embodiment may comprise a software application. The software application in this embodiment may be configured to receive performance data such as DRCs, store and/or process the data, identify optimal phase shifts and generate control signals to provide the desired phase shifts in the secondary signal.

Still another embodiment may comprise a base station configured to operate generally as described above. This embodiment may comprise a beamforming transmission subsystem (e.g., a dual-antenna transmission system configured to transmit phase-shifted signals configured to generate the primary and phase-shifted secondary transmission signals), a receiver subsystem configured to receive DRC data, and a control subsystem configured to track the DRC data, identify optimal control parameter values (e.g., phase shifts) and generate control (e.g., phase shift) information for input to the transmission subsystem.

The various sub-components of the embodiments described above may also vary. For example, the beamforming subsystem may comprise more than two antennas, or a single directional antenna, or an entirely different type of beamforming mechanism. The beamforming mechanism also need not sweep over an entire 0-2π range. While typical wireless telephone network base stations cover 360°, other systems may not be required to have this same coverage.

While the present invention has been described with reference to particular embodiments, it should be understood that the embodiments are illustrative and that the scope of the invention is not limited to such embodiments. Many variations, modifications, additions and improvements fall within the scope of the invention as detailed within the following claims.

What is claimed is:

1. A method comprising:
   measuring a performance of data communications over a transmission beam, wherein the performance is a function of a radiation pattern of the transmission beam; and
   adapting the radiation pattern based upon the performance and feedback data which is indicative of a data rate supported by the transmission beam further comprising tracking the performance as a function of the radiation pattern and
   providing the transmission beam, wherein providing the transmission beam comprises transmitting phase shifted signals on multiple antennas to produce the beam; wherein tracking the performance comprises tracking data rate requests as a function of a phase shift between the phase shifted signals; and wherein adapting radiation pattern transmission based upon the performance comprises identifying optimal phase shifts for each of one or more mobile stations, linearly increasing the phase shift of the phase shifted signals between optimal phase shifts and maintaining the optimal phase shifts for a predetermined period of time.

2. The method of claim 1, wherein the optimal phase shifts corresponding to mobile stations for which there is no data to be transmitted are disregarded.

3. A method comprising:
measuring a performance of data communications over a transmission beam, wherein the performance is a function of a radiation pattern of the transmission beam; and
adapting the position of the radiation pattern based upon the performance and feedback data which is indicative of a data rate supported by the transmission beam farther comprising tracking the performance as a function of the radiation pattern wherein tracking the performance comprises tracking data rate requests, wherein tracking data rate requests comprises maintaining a running weighted average of data rate requests.

4. The method of claim 3, wherein tracking data rate requests further comprises filtering the running weighted average.

5. The method of claim 3, farther comprising providing the transmission beam, wherein providing the transmission beam comprises providing a first signal and a modified signal, wherein the modified signal is a phase-shifted version of the first signal, and transmitting the first signal via a first antenna and transmitting the modified signal via a second antenna, and wherein the pattern of the variable-pattern transmission beam varies as a function of a phase shift of the modified signal.

6. The method of claim 5, wherein tracking the performance comprises tracking performance of data communications as a function of the phase shift.

7. The method of claim 5, wherein adapting the radiation pattern comprises periodically sweeping the phase shift through a range from 0 radians to $2\pi$ radians.

8. The method of claim 7, further comprising identifying optimal phase shifts for data communications, wherein adapting the radiation pattern comprises maintaining the optimal phase shifts for a predetermined period of time and sweeping linearly between optimal phase shifts.

9. The method of claim 5, wherein adapting the radiation pattern comprises identifying optimal phase shifts for data communications and maintaining the optimal phase shifts for a predetermined period of time.

10. A base station comprising:
a transmission subsystem configured to transmit a signal in a variable-pattern transmission beam:
a receiver subsystem configured to receive feedback data from a mobile station, wherein the feedback data is indicative of a data rate supported by the beam; and
a control subsystem configured to correlate the feedback data with control parameters for the transmission beam and to generate control signals based on the feedback data, wherein the control signals are input to the transmission subsystem to control a pattern of the transmission beam, wherein the transmission subsystem comprises multiple antennas, and wherein the transmission subsystem is configured to generate and transmit phase shifted signals on the multiple antennas; wherein the receiver subsystem is configured to receive data rate request information from one or more mobile stations; wherein the control subsystem is configured to identify optimal phase shifts at which each of the one or more mobile stations has an optimal data rate and generate phase shifts for input to the transmission subsystem, wherein the phase shifts linearly increase between optimal phase shifts and maintain the optimal phase shifts for a predetermined period of time.

11. The base station of claim 10, wherein the control subsystem is configured to disregard the optimal phase shifts corresponding to mobile stations for which there is no data to be transmitted.

12. A base station comprising:
a transmission subsystem configured to transmit a signal in a variable-pattern transmission beam;
a receiver subsystem configured to receive feedback data from a mobile station, wherein the feedback data is indicative of a data rate supported by the beam; and
a control subsystem configured to correlate the feedback data with control parameters for the transmission beam and to generate control signals based on the feedback data, wherein the control signals are input to the transmission subsystem to control a pattern of the transmission beam, wherein the feedback comprises data rate requests, wherein the control subsystem is configured to maintain a running weighted average of data rate requests.

13. The base station of claim 12, wherein the control subsystem is configured to filter the running weighted average.

14. A base station comprising:
a transmission subsystem configured to transmit a signal in a variable-pattern transmission beam;
a receiver subsystem configured to receive feedback data from a mobile station, wherein the feedback data is indicative of a data rate supported by the beam; and
a control subsystem configured to correlate the feedback data with control parameters for the transmission beam and to generate control signals based on the feedback data, wherein the control signals are input to the transmission subsystem to control a pattern of the transmission beam, wherein the feedback comprises data rate requests, wherein the transmission subsystem includes a plurality of antennas and is configured to provide a first signal and a modified signal, wherein the modified signal is a phase-shifted version of the first signal, and transmit the first signal via a first antenna and transmit the modified signal via a second antenna, to form the variable-pattern beam as a function of a phase shift of the modified signal, wherein the control subsystem is configured to track performance of data communications as a function of the phase shift, wherein the control subsystem is configured to generate phase shifts that sweep through a range from 0 radians to $2\pi$ radians in a periodic fashion, wherein the control subsystem is configured to identify optimal phase shifts for data communications, and to maintain the optimal phase shifts for a predetermined period of time while sweeping linearly between optimal phase shifts.

15. A base station comprising:
a transmission subsystem configured to transmit a signal in a variable-pattern transmission beam;
a receiver subsystem configured to receive feedback data from a mobile station, wherein the feedback data is indicative of a data rate supported by the beam; and
a control subsystem configured to correlate the feedback data with control parameters for the transmission beam and to generate control signals based on the feedback data, wherein the control signals are input to the transmission subsystem to control a pattern of the transmission beam, wherein the feedback comprises data rate requests, wherein the transmission subsystem includes a plurality of antennas and is configured to provide a first signal and a modified signal, wherein the modified signal is a phase-shifted version of the first signal, and transmit the first signal via a first antenna and transmit the modified signal via a second antenna, to form the variable-pattern beam as a function of a phase shift of the modified signal, wherein the control subsystem is configured to track performance of data communications as a function of the phase shift, wherein the control subsystem is configured to identify optimal phase shifts for data communications, and to maintain the optimal phase shifts for a predetermined period of time while sweeping linearly between optimal phase shifts.

16. A software program product embodied in a medium readable by a data processor, wherein the software program product embodies the method comprising:
receiving performance feedback:
tracking the performance feedback as a function of beam position; and
generating new beam control parameters based on the performance feedback, wherein the performance feedback comprises data rate requests, wherein the beam control parameters comprise phase shifts between transmitted signals, wherein the method further comprises identifying optimal phase shifts corresponding to optimal performance for each of one or more mobile stations and maintaining the optimal phase shifts for a predetermined period of time.

17. The software program product of claim 16, wherein the phase shifts sweep linearly between optimal phase shifts.

* * * * *